(12) United States Patent
Edwards et al.

(10) Patent No.: US 12,264,821 B2
(45) Date of Patent: Apr. 1, 2025

(54) AIRCRAFT ENGINE FOR NITROGEN OXIDE REDUCTION

(71) Applicant: AIRBUS OPERATIONS LIMITED, Bristol (GB)

(72) Inventors: Henry Edwards, Bristol (GB); Martin Lee, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/114,747

(22) Filed: Feb. 27, 2023

(65) Prior Publication Data

US 2024/0167681 A1    May 23, 2024

(30) Foreign Application Priority Data

Feb. 28, 2022  (GB) ..................................... 2202723

(51) Int. Cl.
  *F23R 3/40*      (2006.01)
  *F02C 3/20*      (2006.01)

(52) U.S. Cl.
  CPC .................. *F23R 3/40* (2013.01); *F02C 3/20* (2013.01)

(58) Field of Classification Search
  CPC ................ B01D 53/74; B01D 53/8625; B01D 53/8628; B01D 53/8631; B01D 53/92; B01D 53/9404; B01D 53/9409; B01D 53/9413; B01D 53/9431; B01D 53/9418; F02C 3/30; F02C 7/22; F23R 3/40
  See application file for complete search history.

(56) References Cited

U.S. PATENT DOCUMENTS

| 7,122,224 | B2 | 10/2006 | Das et al. |
| 8,973,346 | B2* | 3/2015 | Bayer .................. F01D 25/305 60/770 |
| 11,141,695 | B2* | 10/2021 | Ito ............................ F02C 3/24 |
| 2002/0056276 | A1* | 5/2002 | Dalla Betta ............ F23L 7/002 60/723 |
| 2009/0133380 | A1 | 5/2009 | Donnerhack |
| 2012/0047870 | A1 | 3/2012 | Kasuga et al. |
| 2017/0252698 | A1* | 9/2017 | Zhang .................. F01N 3/2892 |
| 2020/0023315 | A1* | 1/2020 | Ito ............................ F01D 5/185 |
| 2021/0047953 | A1 | 2/2021 | Gover et al. |
| 2021/0277839 | A1* | 9/2021 | Madden .................... F02C 9/28 |

(Continued)

FOREIGN PATENT DOCUMENTS

| CA | 2 299 746 | 8/2001 |
| DE | 42 42 099 | 6/1994 |

(Continued)

OTHER PUBLICATIONS

Combined Search and Examination Report for GB2202723.9, dated Jul. 20, 2022, 8 pages.

(Continued)

*Primary Examiner* — Alain Chau
(74) *Attorney, Agent, or Firm* — Nixon & Vanderhye P.C.

(57) ABSTRACT

An aircraft engine incudes: a catalyst, e.g. platinum, applied to turbine blades (580c, 590c) and/or to a catalytic grid downstream of the engine's combustion chamber. An exhaust fluid additive injection system is incorporated upstream of the catalyst via a line 560, in a stator blade within the engine. The catalyst is used to reduce NOx emissions from the engine by a Selective Catalytic Reduction reaction.

15 Claims, 9 Drawing Sheets

(56) References Cited

U.S. PATENT DOCUMENTS

| | | | | |
|---|---|---|---|---|
| 2022/0364505 A1* | 11/2022 | Kim | .......................... | F02C 7/22 |
| 2023/0193835 A1* | 6/2023 | Swann | .................... | B64D 27/10 |
| 2023/0194096 A1* | 6/2023 | Stratton | ................. | B01D 53/75 |
| | | | | 60/723 |
| 2023/0194098 A1* | 6/2023 | Haga | ...................... | B01D 53/90 |
| | | | | 502/200 |

FOREIGN PATENT DOCUMENTS

| | | | | |
|---|---|---|---|---|
| DE | 19635930 A1 * | 6/1997 | ............... | F01D 5/18 |
| EP | 0 718 027 | 6/1996 | | |
| EP | 2392796 A1 * | 12/2011 | ........... | B01D 53/343 |
| EP | 3 604 770 | 2/2020 | | |
| JP | 2-55835 | 2/1990 | | |
| JP | 10-159551 | 6/1998 | | |

OTHER PUBLICATIONS

Prakash Prashanth et al., "Post-combustion emissions control in aero-gas turbine engines", Energy Environ. Sci., vol. 14, 2021, 15 pages.

Dr.Sci.Ing. et al., "Combustion chambers with catalytic converters to reduce pollutant emissions from aircraft Gas Turbine Engines", 14 pages.

B. E. Enga et al., "Catalytic Combustion Applied to Gas Turbine Technology", Platinum Metals ReV., vol. 23, No. 4, 1979, 8 pages.

\* cited by examiner

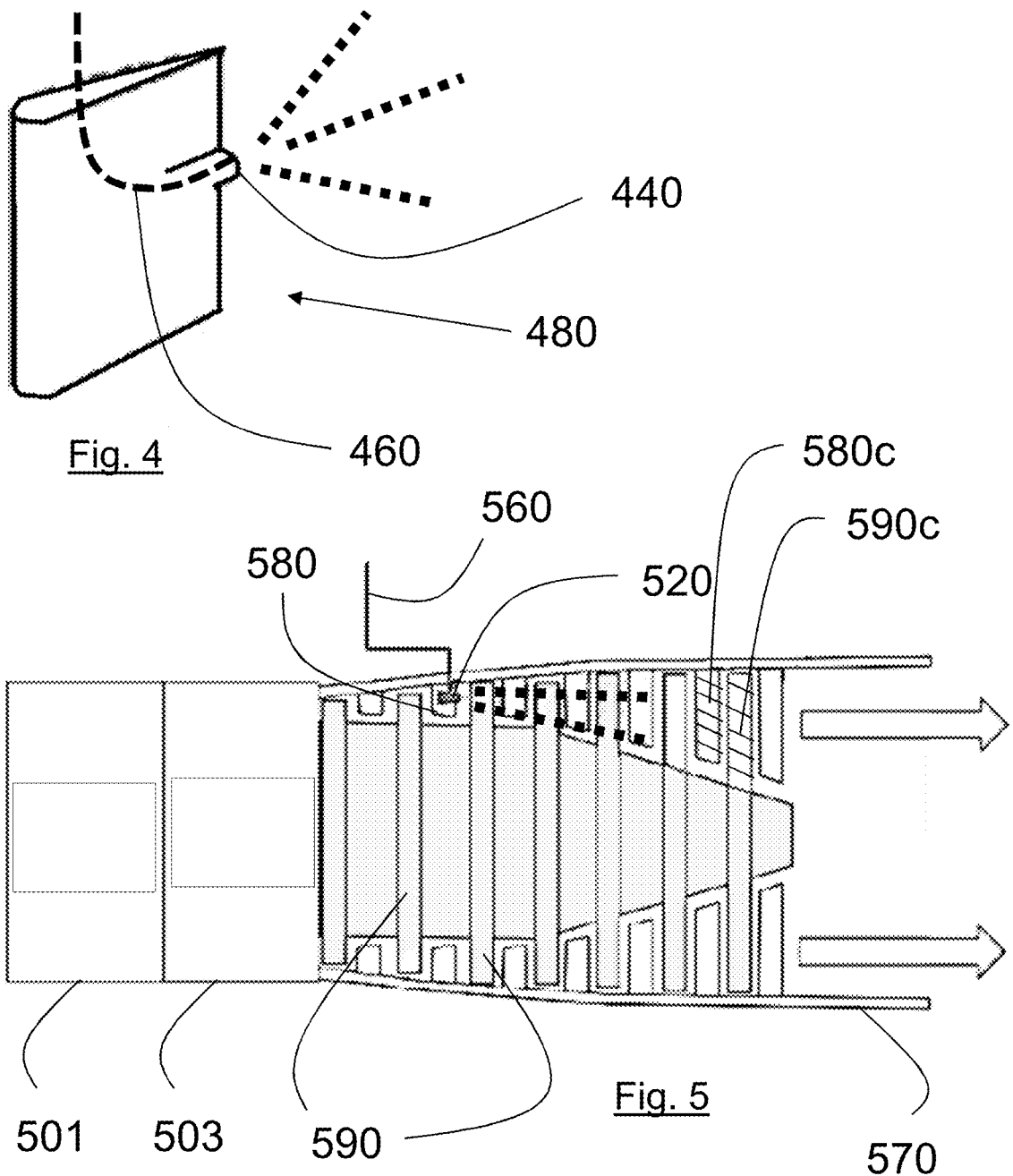

AIRCRAFT ENGINE FOR NITROGEN OXIDE REDUCTION

RELATED APPLICATION

This application incorporates by reference and claims priority to United Kingdom patent application GB 2202723.9, filed Feb. 28, 2022.

BACKGROUND

The present invention concerns aircraft engines. More particularly, but not exclusively, this invention concerns an apparatus and method for reducing nitrogen oxide emissions from aircraft engines.

Gas turbine engines (GTEs) are used to propel aircraft. GTEs intake air and combust jet fuel (also known as aviation turbine fuel) to produce thrust, which propels the aircraft. The most commonly used fuels for commercial aviation are Jet A and Jet A-1, although others, such as Jet B and TS-1, are also used. Jet fuels are mixtures of a variety of hydrocarbons, and can include kerosene and naptha and other hydrocarbons. When combusted with air in a GTE, nitrogen oxides, carbon oxides and other emissions are produced.

Described in the order in which airflow travels through a GTE, GTEs typically comprise a fan followed by a low-pressure compressor and a high-pressure compressor. This is the "cold" section of the GTE, where air is compressed before it reaches the combustion chamber for combustion. In the combustion chamber, the cold, compressed air is combusted in the presence of jet fuel to produce the energy required for mechanical work to be done on the turbine blades downstream of the combustion chamber. Downstream of the combustion chamber ("post combustion") there is a high-temperature "low-pressure" turbine which is driven by the kinetic energy of the air from the combustion chamber. This is connected to a shaft running through the GTE and which drives the initial compressor turbine blades and the fan. Beyond the low pressure turbine there is a nozzle, shaped to maximise the airflow of the hot air and exhaust gases exiting the high-temperature low-pressure turbine.

However, this is not the only air flow path in a modern GTE. GTEs can be characterised as "no bypass", "low-bypass" or "high-bypass". In a low- or high-bypass design turbines drive a ducted fan that accelerates air rearward from the front of the engine. In a high-bypass design, the ducted fan and nozzle produce most of the thrust. Extracting shaft power and transferring it to a bypass stream introduces extra losses which are more than made up by the improved propulsive efficiency. A 10:1 bypass ratio, for example, means that 10 kg of air passes through the bypass duct for every 1 kg of air passing through the core. The turbofan jet engines (GTEs) on modern airliners can have a bypass ratio of up to around 12:1.

In the automotive industry, cars use different fuels in comparison to GTEs. However, diesel engines combusting diesel in air can produce similar oxides to a GTE combusting aviation fuel. Various solutions, which reduce undesirable emissions from automobiles, have been devised, such as use of a catalytic converter or Selective Catalytic Reduction (SCR). In automotive systems, the exhaust fumes from combustion are treated in a catalytic converter or SCR process before they are ejected from the vehicle. In SCR, a liquid called diesel exhaust fluid (DEF), also known as AUS 32 and marketed as AdBlue®, is consumed in the SCR process. DEF is an aqueous urea solution made with 32.5% urea and 67.5% deionized water.

GTEs use thrust to propel the aircraft, and therefore fitting a catalytic converter or applying SCR to a GTE (which would negatively affect the effective thrust) has not been seen as a practical solution for use in aircraft.

The present invention seeks to mitigate one or more of the above-mentioned problems. Alternatively or additionally, the present invention seeks to improve the emissions from gas turbine engines.

SUMMARY OF THE INVENTION

The present invention provides, according to a first aspect, a gas turbine engine for an aircraft. The gas turbine engine comprises a cold pre-combustion section and a hot post-combustion section. The cold pre-combustion section is where the compression of air takes place and the hot post-combustion section is where the combusted air and fuel performs work on hot post-combustion turbine blades. The gas turbine engine also comprises a catalyst arranged in the hot post-combustion section. The catalyst is configured to convert nitrogen oxides into diatomic nitrogen and water in the presence of an exhaust fluid additive. The gas turbine engine also comprises an outlet configured to inject exhaust fluid additive upstream of the catalyst. The catalyst being arranged downstream of the exhaust fluid additive injection site helps with the dispersion/mixing of exhaust fluid additive (because of it being injected into turbulent air passing through the gas turbine engine). The well-mixed exhaust fluid additive then contacts the catalyst downstream of the injection site and some selective catalytic reduction (SCR) can occur.

It may be that within the gas turbine engine, at least one of the cold pre-combustion section and the hot post-combustion section comprises blades, (e.g. wherein the compression section comprises compressor blades and the post-combustion turbine comprises turbine blades). It may be that at least one of the hot post-combustion turbine blades comprises a catalyst. Turbine blades may comprise rotor blades and stator blades. There may be rotor and stator blades which are co-operatively arranged to compress air in the cold section. There may be rotor and stator blades (e.g. turbine blades) which are co-operatively arranged to use hot exhaust gases to perform work on shafts within the gas turbine engine. The rotor and stator blades may be consecutively arranged within at least part of the gas turbine engine. For example, there may be a set of rotor blades, followed by a set of stator blades, followed by a set of rotor blades, followed by a set of stator blades, and possibly followed by further consecutively arranged sets of stator/rotor blades.

It may be that within the gas turbine engine there are a plurality of rotating turbine blades in the hot post-combustion section, at least one of which comprising the catalyst. It may be that there are a plurality of static stator blades, at least one of which comprising catalyst.

The catalyst may be platinum. Platinum catalyst may form at least a part of the surface of the turbine blades to which it is applied. The catalyst may only be selectively applied to the turbine blades. For example, the catalyst may only be applied to areas where modelling has shown the highest concentration of NOx is likely to be, and/or may not be applied to some parts of the blades, for example connection ends of the blades. The catalyst may be applied to both stator blades and rotor blades. In certain embodiments, the amount if any, by mass, of catalyst on the stator blades is less than 50%, optionally less than 25%, and preferably less than 10% of the amount on the rotor blades. It may be that the catalyst is only applied to the rotor blades. The catalyst may be a material which is capable of catalysing nitrogen oxides and exhaust fluid additive into diatomic nitrogen and water and withstanding the temperatures within a gas turbine engine.

The gas turbine engine may be in the form of any aircraft jet engine that burns jet fuel in a manner which creates nitrogen oxide in the exhaust gases. The gas turbine engine may comprise a bypass section. The gas turbine engine may be a bypass turbofan jet engine. The gas turbine engine may comprise a nozzle at a downstream end of the engine. It may be that the turbine blades of the gas turbine engine are aerofoil-shaped turbine blades. The bypass ratio of the turbofan may be greater than 1:4, for example between 1:4 and 1:15 and optionally between 1:5 and 1:12. The air flowrate into the engine may be of the order of several hundred kg/s, possibly up to 1000 kg/s. For example it may be in the range of 200 kg/s and 800 kg/s, possibly about 500 kg/s. The bypass section may surround a core thrust region. The core thrust region is in relation to a bypass, the region comprising the combustion chambers and which produces exhaust gases which produce thrust. It may be that at least 90% by mass of the catalyst is provided in the core thrust region. This includes wherein substantially all of the catalyst is provided in the core thrust region. It may be that at least 70% by mass of the catalyst is provided in the core thrust region. It may be that at least 70%, or optionally at least 90%, of the catalyst is provided in the core thrust region at a post-combustion location within the turbine blades and/or nozzle, and upstream of the region where bypass air and exhaust air mix. It may be that catalyst is also provided at least in part on the nozzle, for example on the inside surface of the nozzle. Providing the catalyst in the core thrust region limits any efficiency losses (due to the physical presence of the catalyst) to the exhaust gases which have nitrogen oxides present, and does not affect the efficiency of the bypass section.

The gas turbine engine may comprise a grid arranged downstream of the hot post-combustion section. The grid may comprise at least part of the catalyst. The grid may comprise at least 90%, by weight, of (and optionally all of) the catalyst. The grid may be arranged in the nozzle. The arrangement of the grid may be designed taking into account the possibly conflicting desired requirements of maximising the contact areas for catalysis of the exhaust gases, whilst minimising the efficiency losses due to its presence in the core thrust region. The grid may for example therefore have an overall shape that is streamline and/or is formed by structure that is streamline. The grid may be in addition to turbine blades comprising catalyst within the gas turbine engine, or it may be that the sole catalyst component within the gas turbine engine. The grid may be provided in multiple parts, possibly comprising spaced apart sub-grids. The grid may comprise ceramic or metal as a structure providing substrate, and may have catalyst coated or applied thereon.

It may be that the gas turbine engine comprises at least one and preferably two or more outlets configured to inject exhaust fluid additive. The outlet(s) may be upstream of the catalyst. The outlet(s) may each be associated with a turbine blade of the gas turbine engine. It is preferred, for easy of manufacture for example, that the outlet(s) are housed in a stator. It may be that one or more outlet(s) are housed in a rotor. At least one of the outlet(s) may be similar to an air bleed outlet in a turbine blade. It may be that there are multiple outlets in a single blade. The outlet(s) may be arranged alongside an air-bleed within a turbine blade. The outlet(s) may be integrated into an air-bleed within a turbine blade. Exhaust fluid additive may be fed to the outlet(s) via a conduit, for example a hydraulic line, within the turbine blade. The outlet may comprise an additive outlet nozzle. The additive outlet nozzle may improve dispersion of the additive in the gas turbine engine.

It may be that within the gas turbine engine, each turbine blade which comprises an exhaust fluid additive outlet is associated with part of the post combustion turbine. For example, it may be that at least one of the stator blades and/or at least one of the rotor blades of the post-combustion turbine blades comprises an outlet configured to inject exhaust fluid additive.

It may be that within the gas turbine engine, each turbine blade which comprises an exhaust fluid additive outlet forms part of the high-pressure post combustion turbine. The high-pressure post-combustion turbine blades may be considered as the blades which are downstream of the combustion chamber, and connected via an axle to the high-pressure pre-combustion turbine blades. The high-pressure post-combustion turbine blades may be considered as the turbine blades immediately downstream of the combustion chamber, which form up to half of the post-combustion turbine blades by number (of turbine blades). The post-combustion section also comprises lower-pressure turbine blades, which are downstream of the high-pressure turbine blades and are axially connected to low-pressure turbine (fan) blades at the front of the gas turbine engine. It may be that the catalyst forms part of the surface of turbine blades within the lower-pressure turbine blades. It may be that at least 75% by weight (preferably at least 90%) of the catalyst in the engine (i.e. the catalyst used for reducing NOx emissions) is present on the surface of the lower-pressure blades and less than 25% (preferably less than 10%, and more preferably zero) is on the high-pressure blades. It may be that catalyst is only present on the surface of the lower-pressure blades (i.e. none on the high-pressure blades). In other embodiments, it may be that substantially all of the blades are covered, at least in part, with catalyst (i.e. both high-pressure and lower-pressure post-combustion blades). Each turbine blade may be connected to other turbine blades within a ring/disc of turbine blades. Multiple such rings of turbine blades may be coated with catalyst. Similarly, multiple rings of turbine blades may comprise exhaust fluid outlets, and these may be completely upstream of the catalyst-coated rings or they may be interspersed with outlets for exhaust fluid additive before and after some of the catalyst-coated rings.

It may be that exhaust fluid additive is fed to at least one outlet housed within a stator blade within the high-pressure turbine section. The stator blade may have an aerofoil shape. The outlet may be at the tail of the aerofoil. The outlet may be arranged to point in the downstream direction of the blade.

The gas turbine engine may have a pressure ratio of 40× to 60×. The pressure ratio is the ratio of stagnation pressure at the engine's inlet to the pressure at the exit of the final compressor blades. The gas turbine engine may have a temperature range of between 500° C. and 1600° C. The turbine blades immediately downstream of the combustion chamber may in use be at temperatures between 1200° C. and 1800° C., and are typically 1400-1700° C. (for example in the range of 1500-1600° C.). The temperature in the region of the low pressure turbine blades downstream of the combustion chamber is typically 800-1200° C. and the temperature at the downstream end of the nozzle is at least 400° C. (e.g. 500-700° C.) degrees Celsius. It may be that the parts coated with the catalyst (e.g. platinum) are made from titanium.

It may be that each of the turbine blades which comprises an outlet is a stator. Providing the outlet in a stator allows for the stator to have a dual function, and indeed a synergistic one wherein the increased air turbulence/mixing caused by the stator provides a benefit to the mixing of the exhaust fluid additive injected therefrom.

It may be that there is a tank system configured to supply exhaust fluid additive to the one or more exhaust fluid additive outlets. The tank system may comprise at least one tank for storing exhaust fluid additive safely within the structure of the aircraft and/or engine. The tank system may comprise at least one pump configured to move the exhaust fluid additive to the one or more exhaust fluid additive outlets.

The tank system may comprise a tank in a wing or may comprise a tank in a pylon between the gas turbine engine and the wing. The tank may be housed within the casing of the gas turbine engine. The tank may be arranged close to the combustion section, for example within the structure of the gas turbine engine and surrounding the combustion section of the gas turbine engine. The exhaust fluid additive may be supplied to the gas turbine engine from the tank via a conduit (or piping or manifold) through portions of the wing and pylon into the gas turbine engine and may pass through conduit (or piping or manifold) through the gas turbine engine to the one or more outlet(s).

The tank may, for example when in use, comprise exhaust fluid additive. There may for example be more than 400 litres of exhaust fluid additive. The tank may be sized to hold at least 400 litres. The size of the tank may be proportional to the capacity of the fuel tanks. The tank (or tanks) for the exhaust fluid additive may be sized to hold a sum volume at least 2.5% (for example 4% or more) of the total capacity of the fuel tanks of the aircraft. For larger aircraft, the tank for the exhaust fluid additive may have a capacity of at least 800 litres, and possibly at least 1200 litres. For example, for an aircraft with a fuel capacity of 30,000 litres, a 1200 litre exhaust fluid additive tank may be present, representing an exhaust fluid additive to fuel ratio of 4%. The exhaust fluid additive may comprise water (it may, in one example, consist of a mixture of ⅓ Urea and ⅔ water) which may be sourced from a separate tank in the aircraft, allowing the exhaust fluid additive tank to be sized to contain concentrated urea (per this example, although other compositions are envisaged). The exhaust fluid additive may comprise a mixture of water and Urea. The water may be de-ionised water. The exhaust fluid additive may comprise at least about 5% Urea in the mixture, at least about 15% Urea in the mixture, at least about 25% Urea in the mixture, at least about 32.5% Urea in the mixture, or at least about 33% Urea in the mixture. The exhaust fluid additive may comprise diesel exhaust fluid (DEF), with composition as provided above. In the above example, the tank may therefore be sized at 400 litres instead of 1200 litres. In such a case, the tank (or tanks) for the (concentrated/undiluted) exhaust fluid additive may be sized to hold a sum volume of at least 1% (and possibly no larger than 2%) of the total capacity of the fuel tanks of the aircraft.

According to a second aspect of the invention there is provided a method of reducing NOx emissions from an aircraft jet engine. The method comprises a step of jet fuel combusting in a combustion chamber of the jet engine to create combustion gases (exhaust gases) comprising NOx gases. The method further comprises a step of reacting the NOx gases with an exhaust fluid additive in the presence of a catalyst which forms at least part of a surface of the jet engine that is downstream of an exhaust fluid additive injection outlet. The method therefore enables the reduction of NOx emissions from a gas turbine engine.

According to a third aspect of the invention there is provided a method of operating an aircraft engine. The method of operating an aircraft engine comprises the step of supplying exhaust fluid additive in a gas turbine engine upstream of a catalyst so that the exhaust fluid additive so injected reacts with exhaust gases from the engine in the presence of the catalyst in the engine. This mode of operation may be suitable for implementing the method of the second aspect with the engine of the first aspect.

According to a fourth aspect there is provided a method of manufacturing an aircraft or a part thereof comprising an engine according to the first aspect, or an engine configured to be used as the engine of the method according to the second or third aspect. The method of the fourth aspect includes installing a tank configured to supply exhaust fluid additive to the engine. Installing should be understood to encompass retrospective installation (i.e. retrofitting).

According to a fifth aspect there is provided an aircraft comprising a gas turbine engine according to the first aspect, or an engine configured to be used as the engine of the method of the second or third aspects.

According to a sixth aspect there is provided a kit of parts for an aircraft jet engine, the kit comprising a turbine blade comprising platinum catalyst on its surface and a device comprising an outlet configurable to pass exhaust fluid additive onto the platinum catalyst.

According to a seventh aspect there is provided a set of turbine blades for an aircraft jet engine, the set comprising a stator blade comprising an outlet configured to pass exhaust fluid additive; and a turbine blade comprising platinum catalyst on its surface.

According to an eighth aspect there is provided a method of manufacturing a selective catalytic reduction system for reducing NOx emissions from an aircraft jet engine, the method including a step of coating a turbine blade with a material which acts as a catalyst as part of the catalytic reduction system.

The invention may be embodied as a kit of parts for an aircraft jet engine comprising: a turbine blade comprising a platinum catalyst on a surface of the turbine blade, and a device comprising an outlet configured to pass an exhaust fluid additive onto the platinum catalyst.

The invention may be embodied as a set of turbine blades for an aircraft jet engine, the set comprising; a stator blade comprising an outlet configured to pass an exhaust fluid additive; and a turbine blade comprising platinum catalyst on a surface of the turbine blade.

The invention may be embodied as a method of manufacturing a selective catalytic reduction system for reducing NOx emissions from an aircraft jet engine, the method including: coating a turbine blade with a material which acts as a catalyst as part of the catalytic reduction system.

There may be an aircraft comprising a tank system, wherein the tank system is configured to hold and supply exhaust fluid additive from a tank within a pylon or a wing, to outlets arranged within a gas turbine engine.

Thus, the invention also provides a turbine blade for an aircraft jet engine coated with a catalyst for the purpose of reducing NOx emissions.

Part of any of the above mentioned methods may comprise coating a turbine blade for an aircraft jet engine with a catalyst for the purpose of reducing NOx emissions.

There is also provided a method of reducing NOx emissions from aircraft jet engines including coating a turbine blade for an aircraft jet engine with a material which acts as a catalyst as part of a selective catalytic reduction system.

Certain embodiments have in common that there is a gas turbine engine for an aircraft, the gas turbine engine comprising pre-combustion compressor blades and post-combustion turbine blades, wherein at least one of the post-combustion turbine blades comprises a catalyst, and wherein the gas turbine engine includes an outlet configured for supplying exhaust fluid additive to the catalyst.

It will of course be appreciated that features described in relation to one aspect of the present invention may be incorporated into other aspects of the present invention. For example, the method of the invention may incorporate any of the features described with reference to the apparatus of the invention and vice versa.

SUMMARY OF THE DRAWINGS

Embodiments of the present invention will now be described by way of example only with reference to the accompanying schematic drawings of which:

FIGS. 4 and 5 show a gas turbine engine in accordance with the second embodiment;

DETAILED DESCRIPTION

The present disclosure is of a gas turbine engine having a catalyst and an outlet for exhaust fluid additive arranged upstream of the catalyst within the engine. The outlet sprays exhaust fluid additive so that it can be contacted on the catalyst and a selective catalytic reduction reaction can occur. The (preferably aqueous) solution sprayed from the outlet comprises anhydrous ammonia, aqueous ammonia or a urea solution. The catalyst is platinum. The catalyst can be a platinum coating on the turbine blades of the post-combustion section of the gas turbine engine and/or the catalyst can be applied to a grid/mesh downstream of the post-combustion turbine blades, within the nozzle of a central core region of the gas turbine engine. The jet engine is a turbofan engine with a bypass, and the catalyst and injection outlet are applied to the core region. There is also a tank for storing the exhaust fluid additive, housed within the wing or pylon, or within the casing.

Figure 1A:
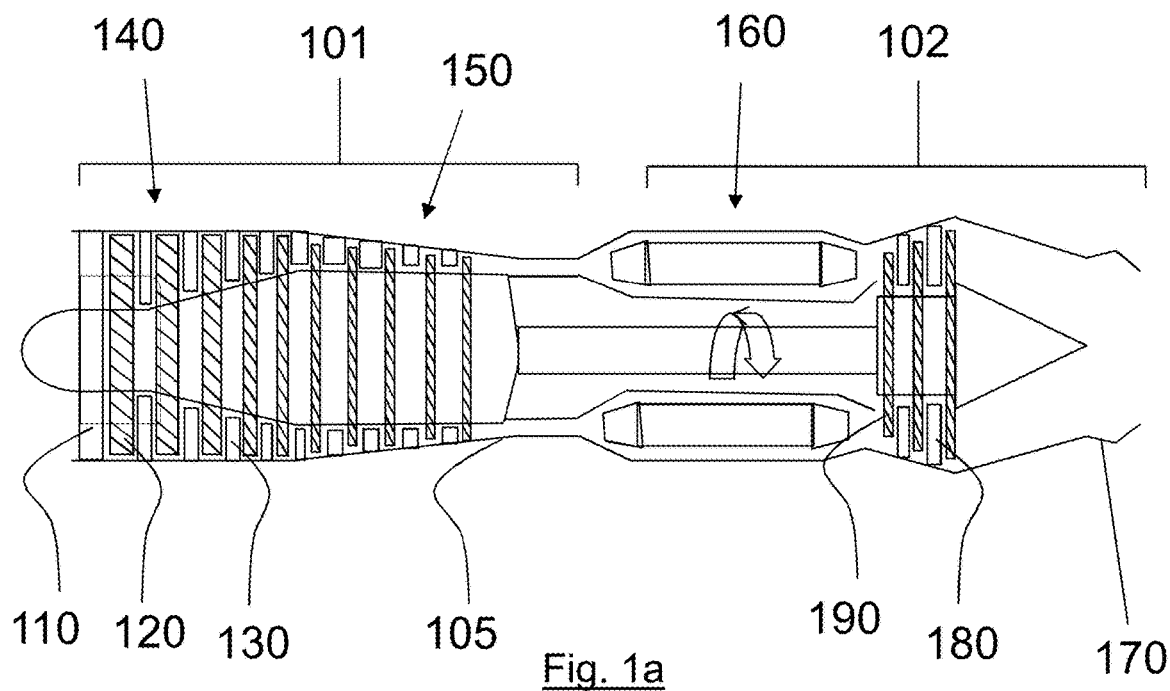
FIGS. 1a and 1b show a prior art gas turbine engine.
Figure 1B:
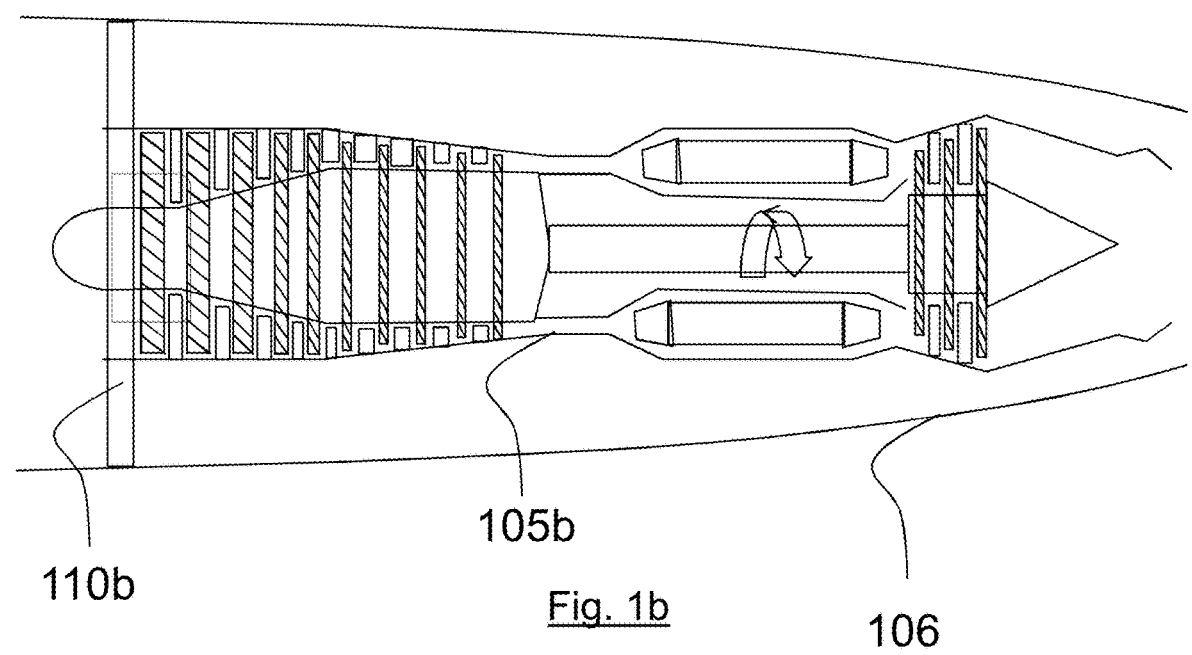

FIGS. 1a and 1b show a prior art gas turbine engine (GTE), or turbofan, of the like used in passenger aircraft. The GTE shown in FIG. 1a comprises an air inlet 110 followed by a low-pressure compressor 140 and then downstream of the low-pressure compressor 140 there is a high-pressure compressor 150. Together, these are the "cold" section 101 of the GTE, where air is compressed by compressor blades (stator blades 130 and rotor blades 120) before it reaches a combustion chamber 160 for combustion.

In the combustion chamber 160, the cold compressed air is combusted in the presence of jet fuel to produce the energy required for mechanical work to be done on high-pressure high-temperature turbine blades (rotor blades 190 and stator blades 180) immediately downstream of the combustion chamber. Downstream of the combustion chamber ("post combustion") and high-temperature high-pressure turbine blades there is a high-temperature "lower-pressure" turbine which is also driven by the kinetic energy of the air from the combustion chamber. This is connected to a shaft running through the GTE and which drives the low-pressure compressor blades and the fan inlet. Beyond the low pressure turbine there is a nozzle 170, shaped to help the airflow of the hot air and exhaust gases exiting the high-temperature low-pressure turbine generate thrust. The engine has a casing 105 surrounding it. The post-combustion section of the engine is the "hot" section 102, and includes the high-temperature turbine blades of both higher and lower pressure, and the nozzle 170.

FIG. 1b shows a turbofan of the prior art, in which the fan blades 110b are sized and shaped to draw airflow around the core region (the central components) of the engine in a "bypass". The fan blades 110b drive air between an outer casing 106 of the engine and an inner casing 105b. The air is combined with the exhaust gases of the engine at the nozzle to increase the amount of thrust generated, in comparison to a "no-bypass" arrangement. Modern turbofans typically have a "bypass ratio" of between 1:5 and 1:14, and usually about 1:10, which means that per 1 kg of air which travels through the combustion internals, 10 kg passes through the bypass.

Figure 2A:
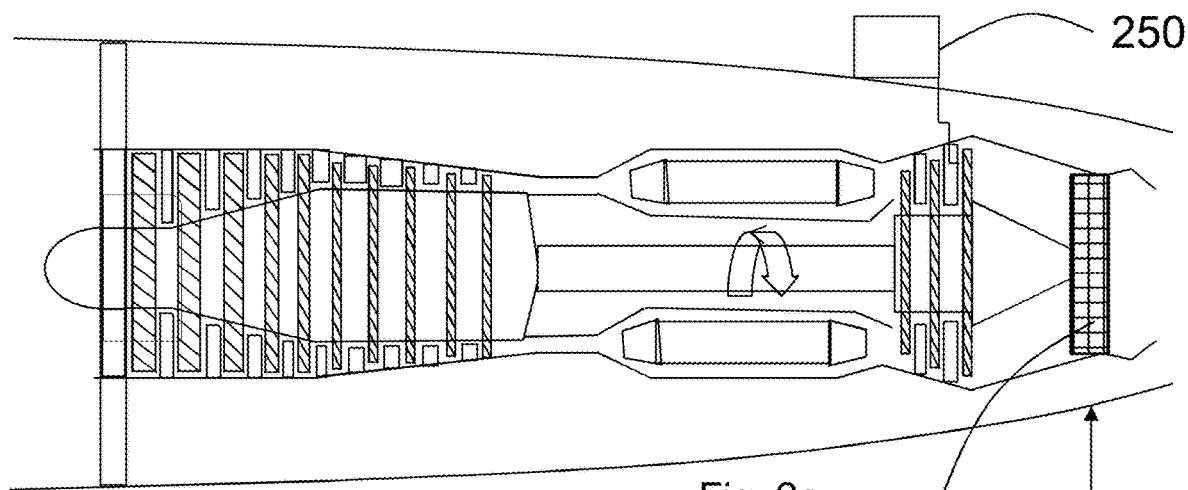
FIGS. 2a and 2b show a gas turbine engine according to a first embodiment.
Figure 2B:
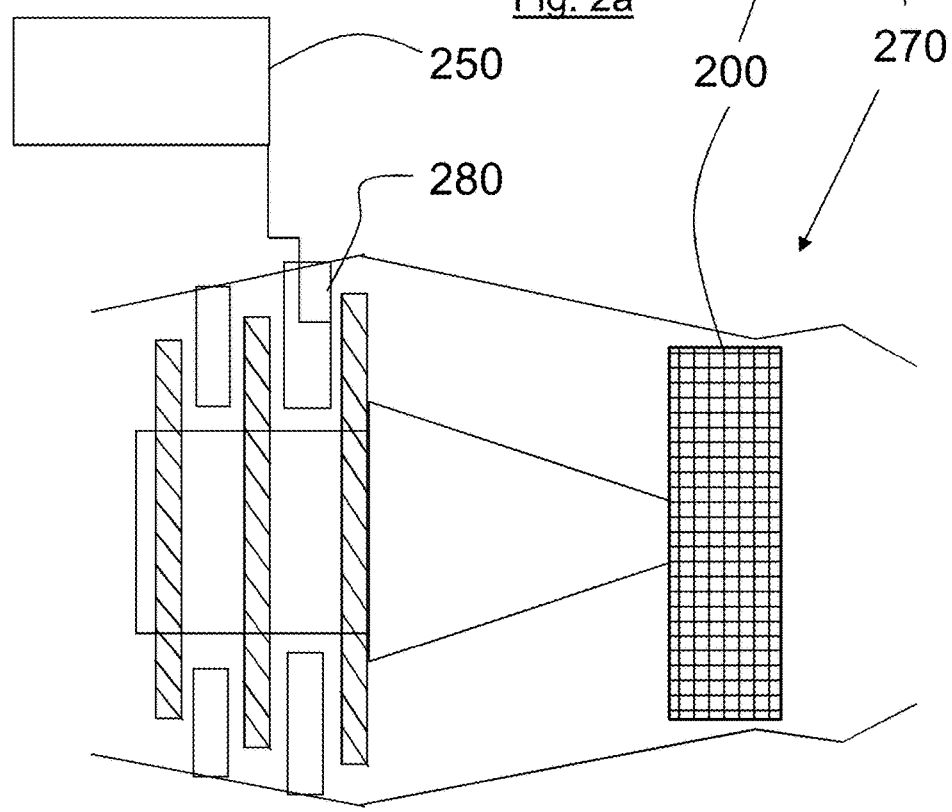

A first embodiment of the invention is shown in FIGS. 2a and 2b. As can be seen in the figures, the pre-combustion "cold" section of the GTE is essentially the same as in the prior art. In the first embodiment there is a catalytic grid 200 located in the region of the nozzle 270. There is also a tank 250, containing exhaust fluid additive housed externally of the internals of the core of the turbofan, with a line to an injection outlet in a stator 280 of the post-combustion "hot" section of the GTE. In this arrangement, exhaust fluid additive is distributed throughout the exhaust gases within the turbulent exhaust gas airflow (which helps with distribution of the exhaust fluid additive) and is then contacted on the downstream catalytic grid. The catalytic grid provides a surface area of platinum on which the nitrogen oxides in the exhaust gases can be broken down into diatomic nitrogen and water in the presence of the exhaust fluid additive.

The catalytic grid structure 200 in this embodiment provides some resistance to the exhaust gases leaving the core portion of the engine, and therefore negatively affects the generation of thrust of the core portion. By applying it only to the core portion of a turbofan engine with a bypass, and not applying it to the bypass gases (air), it has been realised that the overall effect on the thrust produced is low (as a large proportion of the thrust is generated by the bypass gas, which does not flow through the catalytic grid), whilst enabling emission reduction on all of the exhaust gases of the core portion.

Figure 3A:
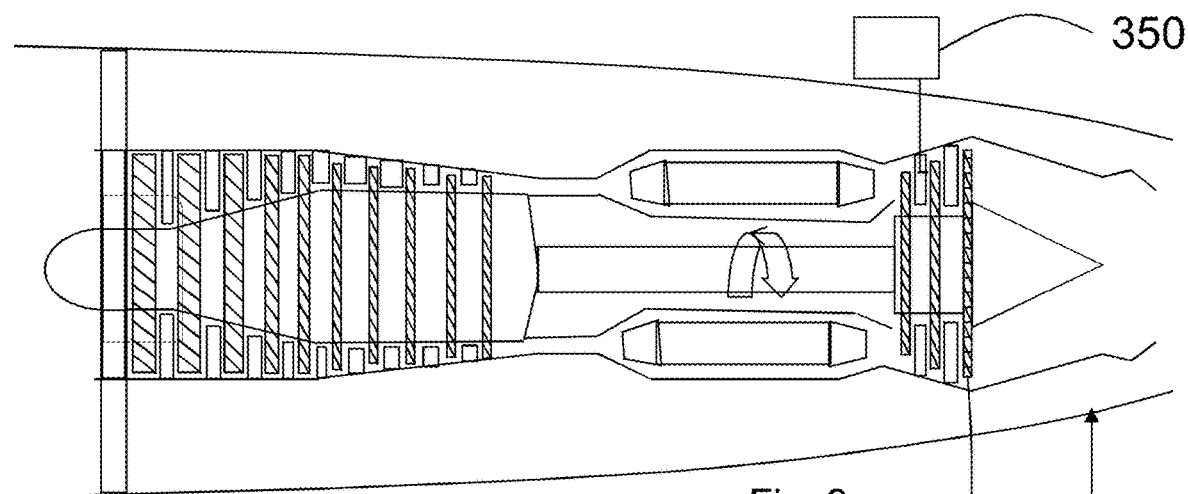
FIGS. 3a and 3b show a gas turbine engine according to a second embodiment.
Figure 3B:
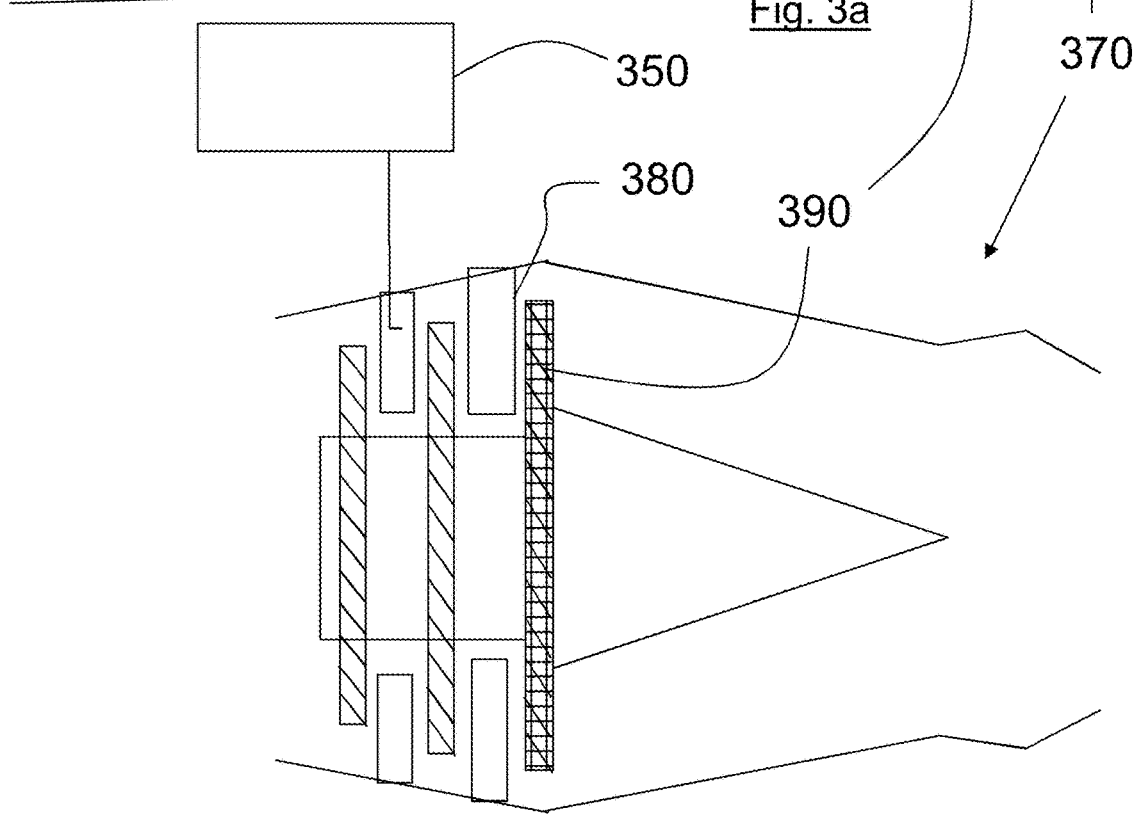

FIGS. 3a and 3b show a second embodiment of the invention with like reference numerals (separated by 100) denoting like components (e.g. the tank 250 is equivalent to the tank 350), wherein, as with the first embodiment, the pre-combustion "cold" section of the GTE is essentially the same as in a prior art GTE. The difference in comparison to the first embodiment is that there is no platinised "grid" downstream of the final turbine, and instead, at least one of the turbine blades (shown in this figure as rotor blades 390)

comprises platinum on its external surface, on which exhaust fluid additive can be contacted. The inventors have realised that the post-combustion turbine blades (stator and/or rotor blades) can provide a surface area of platinum to react nitrogen oxides into nitrogen and water, without having a catalytic grid in the pathway of the exhaust gases. A catalytic grid in the pathway of the exhaust gases reduces the effective thrust produced by the core of the engine. With the second embodiment it is possible to realise at least some of the benefit of having a catalyst in contact with the exhaust fluid additive and the exhaust gases, without incurring the losses associated with a catalytic grid downstream of the "hot" turbine. In the same manner as the first embodiment, the second embodiment can be applied to only the "core" portion of a turbofan engine, with the bypass gases combining with the exhaust gases at the nozzle, downstream of the catalyst.

FIG. 4 shows a stator 480 for use in the present invention. The stator 480 includes an injection outlet 440 and an internally housed line 460 for exhaust fluid additive to travel through the stator to the injection outlet.

In FIG. 5, the stator 580 is one of multiple stators forming a stator ring arranged between the rotors 590 (between rotor rings) within the turbofan jet engine, within the "core" portion of the turbofan engine. As can be seen in FIG. 5, there are rotor 590c and stator rings 580c comprising catalyst. The rotor 590c and stator 580c rings comprise multiple rotor and stator blades. The rotor 590c and stator 580c rings comprising catalyst are arranged downstream of the exhaust fluid additive injector 520 which in this example is integrated into a stator blade 580. The injected exhaust fluid additive travels downstream and at least partially mixes with the exhaust gases before being contacted on the catalyst-bearing rotor and stator blades. The exhaust fluid additive travels from a tank (not shown) through a line 560 and is injected as a liquid but typically vaporises at the operating temperature of the engine. The black dots in FIG. 5 are indicative of the exhaust fluid additive travelling through the gas turbine engine. As the gases within the turbine expand and do work in the post-combustion section of the engine, the temperatures decrease. The catalyst coatings can therefore be arranged within the nozzle 570 to coincide with the temperature range which is optimal/required for SCR. This temperature range can be in the range from 700° C. to 1450° C., with the preferred range being between 850° C. and 1200° C. The low-temperature compression section 501 and the combustion section 503 are also shown in FIG. 5, to help to illustrate the flow direction within the figure.

FIG. 5 shows a possible implementation of the second embodiment. In this implementation, there is a stator (as shown in FIG. 4) upstream of platinum coated rotors 590c and stators 580c. An outlet within an upstream stator 580 is configured to inject exhaust fluid additive to the hot gaseous exhaust stream which leaves the combustion section 503. The exhaust fluid additive and exhaust gases at least partially mix and then contact the platinum-coated rotors 590c and/or stators 580c. Coating the rotors and stators downstream of the exhaust fluid additive injection outlet can maximise and/or optimise the surface area on which SCR can occur. Platinum is expensive, as well as being a rare metal, and it is therefore preferred to selectively coat the stators and rotors to optimise catalysis, for example by not coating the connection ends of the turbine blades. The efficiency gains in doing so might be such that it is optimal (from a cost/efficiency perspective) to apply a platinum coating to up to 100% of the visible surfaces of the low-pressure post-combustion turbine. In FIG. 5 the post-combustion turbine blades are shown as sequential rotors and stators, which is the standard arrangement in a turbofan jet engine. Downstream of the combustion chamber there may first be an exhaust fluid additive outlet, followed by an area of platinum catalyst.

Figure 6:
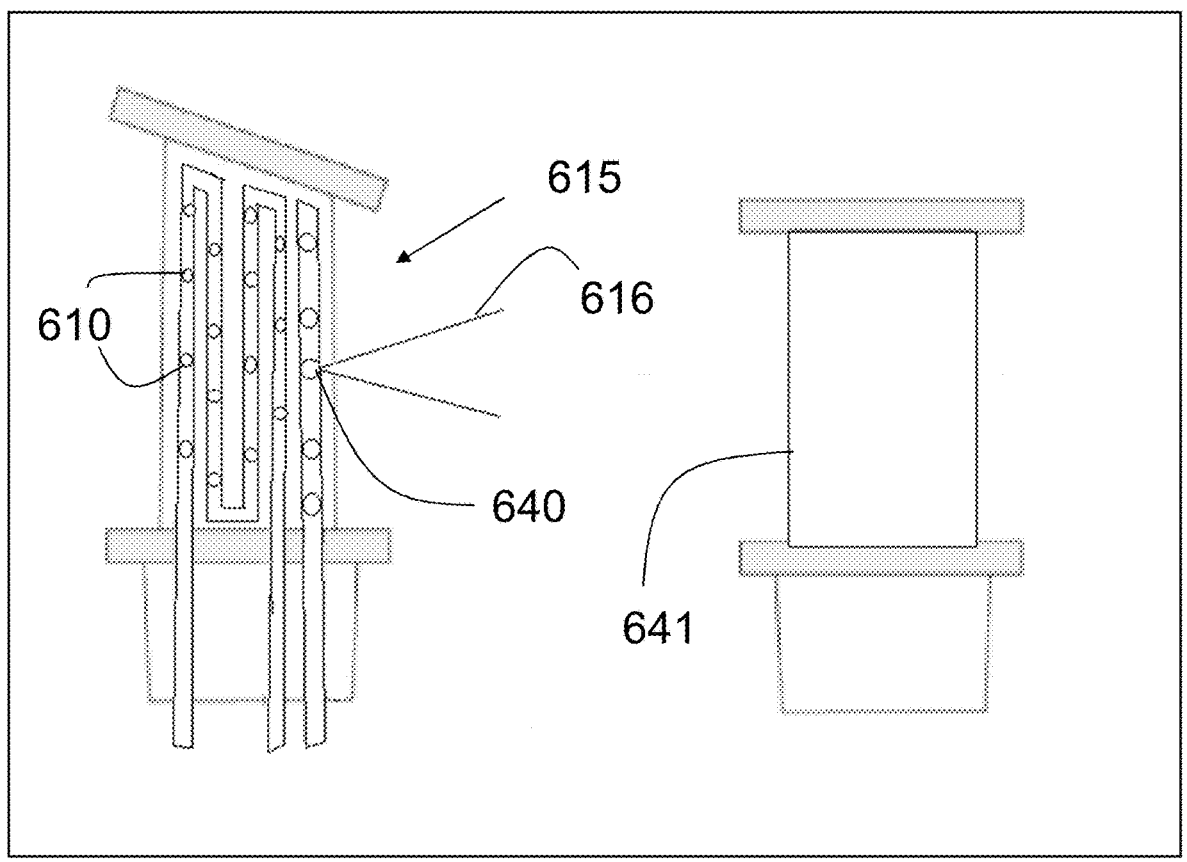
FIG. 6 shows two turbine blades according to a third embodiment of the invention.

FIG. 6 shows an embodiment wherein a high-pressure post-combustion turbine blade 615 houses ("air bleed") outlets 610 for air supply to the blade, and outlets 640 for the exhaust fluid additive to enter the gaseous stream (this is shown with lines 616 to highlight the flow path of exhaust fluid additive from the turbine blade). In this embodiment the turbine blade 615 may have the air bleed outlets and/or the exhaust fluid additive outlets 640. FIG. 6 also shows a (downstream) blade 641 of the post combustion turbine coated with platinum catalyst. The platinum catalyst turbine blade is downstream of the high-pressure turbine so that the exhaust gases and the exhaust fluid additive are contacted together on the catalyst-coated blade of the turbine blades having lower pressure and temperature than the blades adjacent the combustion chamber. These rotor and stator blades can form part of a set. As can be seen in FIG. 6, the exhaust fluid additive injection can be similarly implemented to the air supply to the blade. A tank system feeds the exhaust fluid additive to the outlets within the blade. The outlets can be holes and can be multiple holes.

Figure 7:
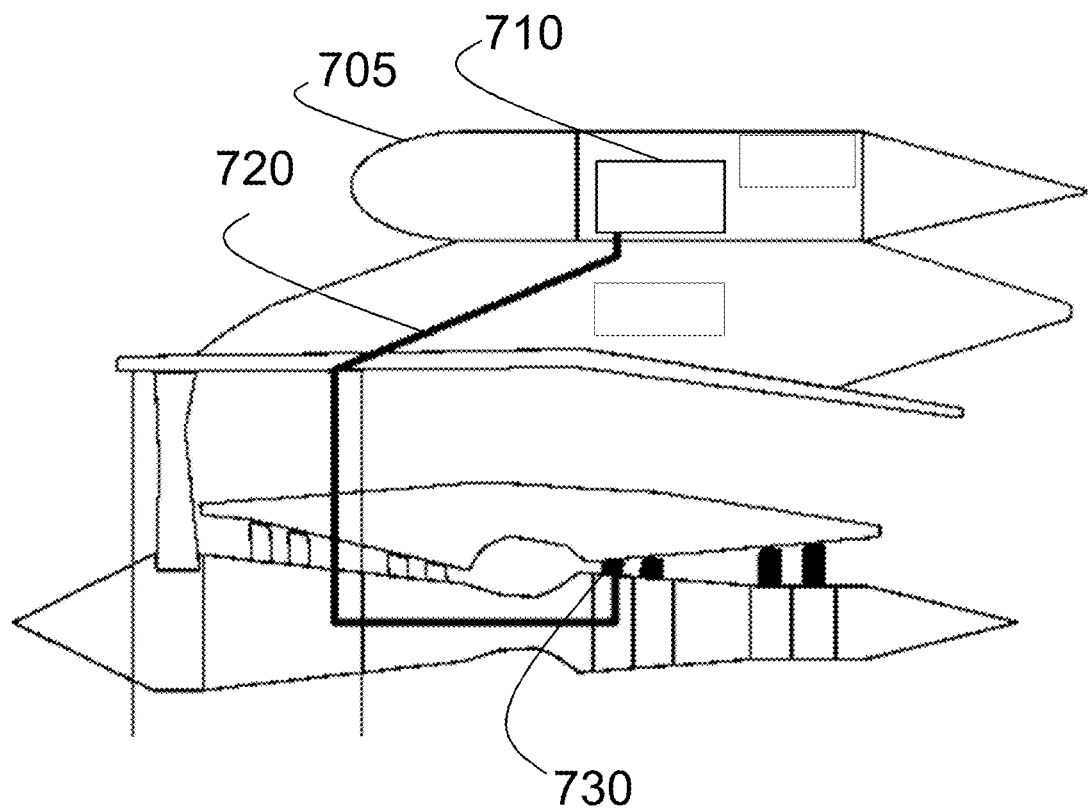
FIGS. 7, 8 and 9 show schematic diagrams of the tank system of an embodiment of the invention.

FIG. 7 shows an example of a tank system which can be used to supply exhaust fluid additive to the gas turbine engine. In FIG. 7 the tank 710 is housed within the structure of the wing 705. There are pumps (not shown) which drive the fluid within a line 720 (e.g. conduit, pipe) to a position within the gas turbine engine and from there to an outlet 730 within the post-combustion section of the engine.

Figure 8:
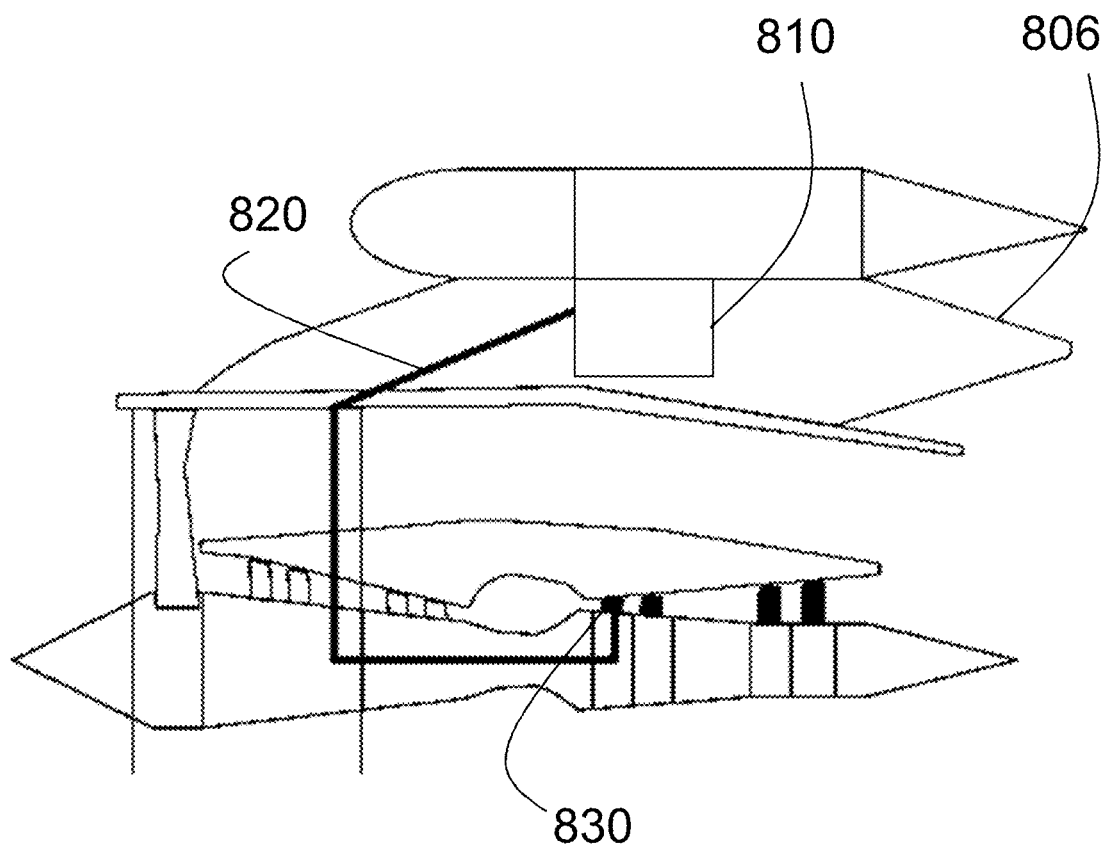

FIG. 8 shows another example of a tank system, wherein the tank 810 is housed within a pylon 806 which joins the gas turbine engine to the wing.

Figure 9:
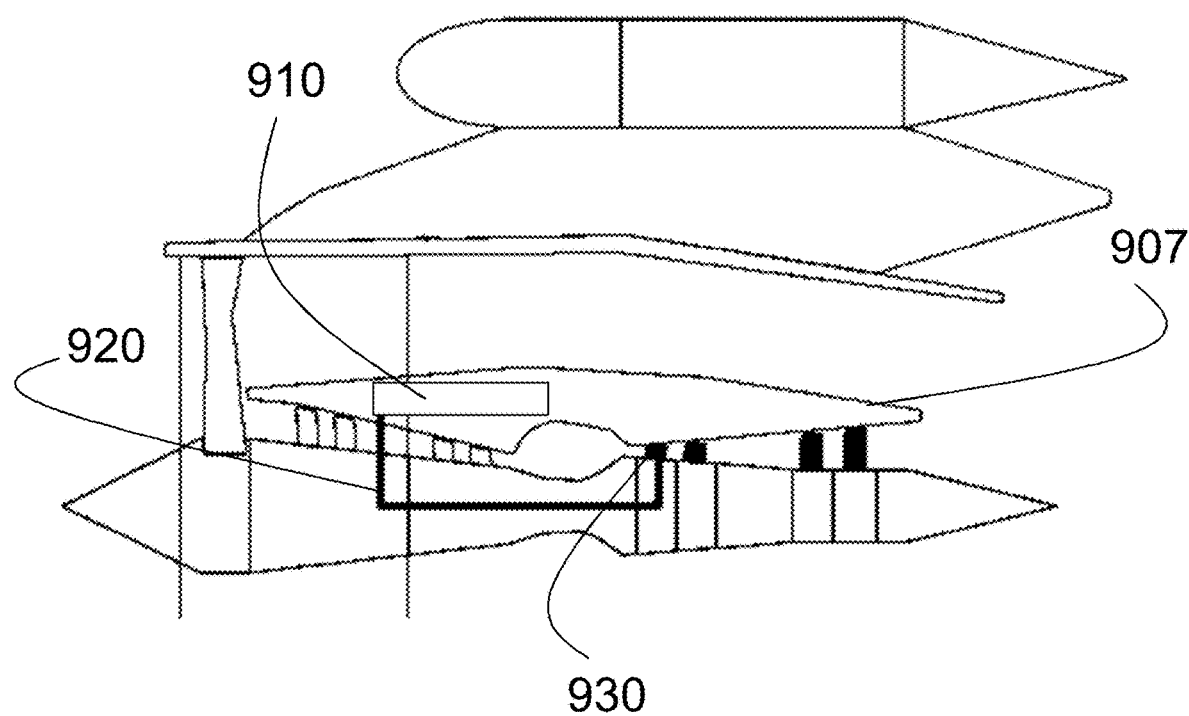

FIG. 9 shows another example of a tank system, wherein the tank 910 is housed within the structure of the gas turbine engine, within the casing 907 surrounding the core region of the engine. FIG. 9 also shows the line 920

Figure 10:
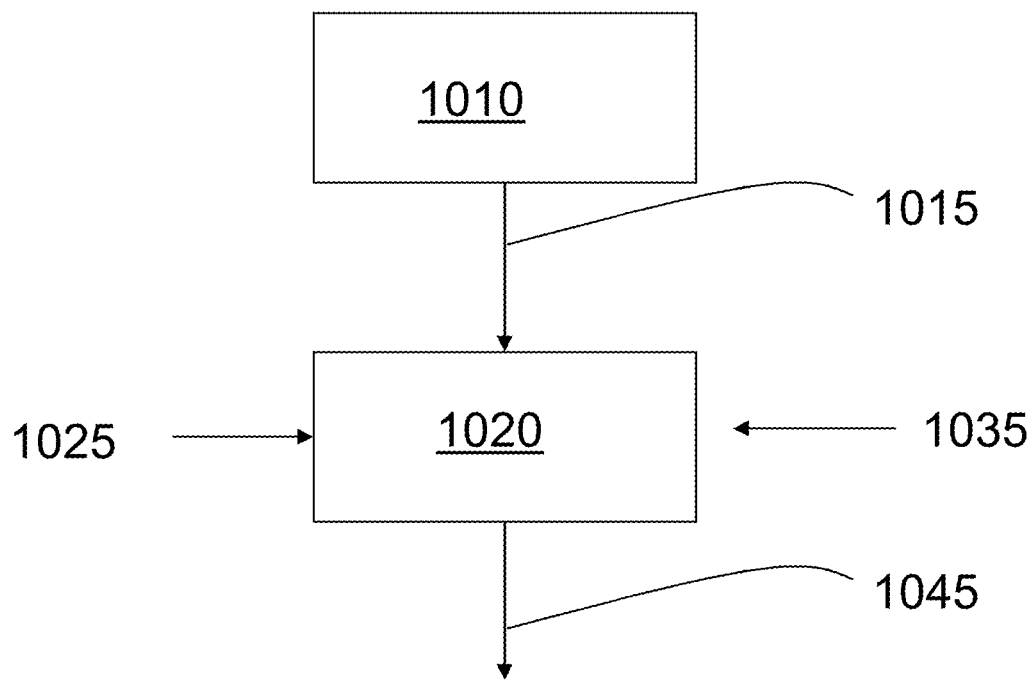
FIG. 10 is a flow diagram of a method of performing an embodiment of the invention.

FIG. 10 shows a flow diagram of a method of reducing nitrogen oxide (NOx) emissions from an aircraft jet engine. The steps the method comprising the steps of combusting 1010 jet fuel in a combustion chamber of the jet engine to create combustion gases 1015 comprising NOx gases, and reacting 1020 the NOx gases with an exhaust fluid additive 1025 in the presence of a catalyst 1035 which forms at least part of a surface of the jet engine that is downstream of an exhaust fluid additive injection outlet. Downstream of the catalyst there is a stream 1045 comprising diatomic nitrogen, water, and unreacted exhaust gases.

Figure 11:
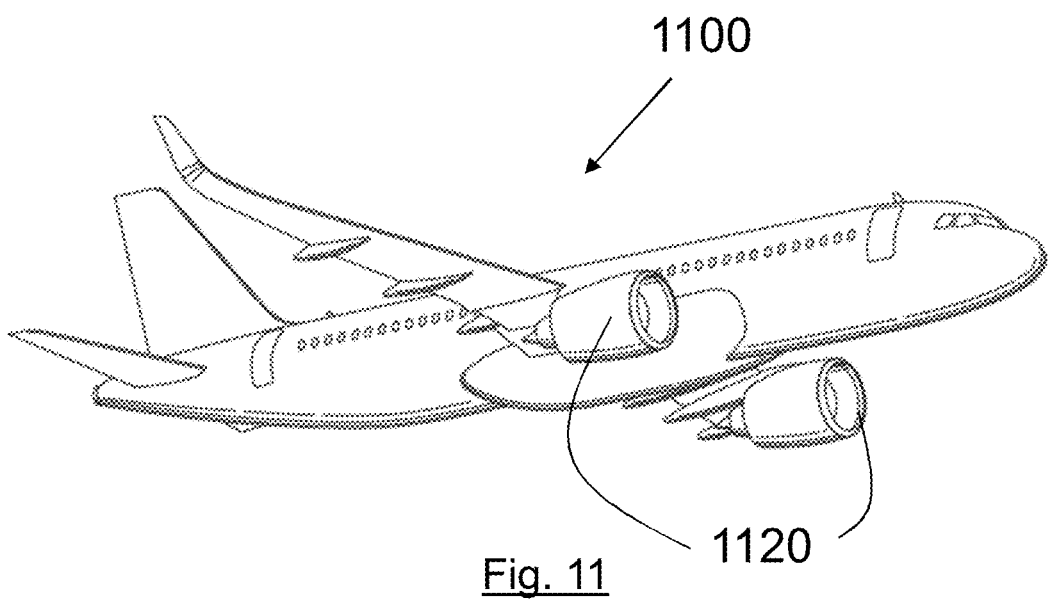
FIG. 11 is an aircraft incorporating an embodiment of the invention.

FIG. 11 shows an aircraft 1100 having two gas turbine engines 1120, which in this example are turbofan jet engines in accordance with any of the embodiments described herein. The aircraft 1100 is suitable for transporting passengers and/or cargo. In the case were the aircraft is a passenger aircraft, the passenger aircraft may comprise a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It is possible that different embodiments can be combined—for example the catalytic grid of the first embodiment could be used in addition to the catalyst coated turbine blades of the second embodiment. Furthermore, the turbine blades in the third embodiment could be used in conjunction with either the first and/or second embodiments.

The platinum catalyst may be coated on to rotor blades and/or stator blades downstream of the exhaust additive fluid outlet within the gas turbine engine. There may, however, be multiple outlets for exhaust fluid additive. There may be catalyst upstream and downstream of the outlets for exhaust fluid additive. The catalyst may partially or entirely cover the rotor and/or turbine blades.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention is:

1. A gas turbine engine assembly for an aircraft, the gas turbine engine assembly comprising:
a gas turbine engine including:
a cold pre-combustion section;
a combustion section configured to combust jet fuel to generate combustion gases;
a hot post-combustion section including rotating turbine blades and stator blades;
a catalyst in the hot post-combustion section and configured to convert nitrogen oxides in the combustion gases flowing along a flow path through the hot post-combustion section into diatomic nitrogen and water in presence of an exhaust fluid additive; and
at least one outlet in one or more of the stator blades, wherein the at least one outlet is configured to inject exhaust fluid additive upstream of the catalyst in the flow path, and the one or more stator blades with the at least one outlet are between a plurality of the rotating turbine blades;
wherein the exhaust fluid additive has a different composition than the jet fuel,
wherein the exhaust fluid additive is configured to react, in the presence of the catalyst, with the nitric oxides (NOx) in the combustion gases flowing through the hot post-combustion section, and
a tank system configured to contain the a tank system configured to contain the exhaust fluid additive which is supplied to exhaust fluid additive which is supplied to the at least one outlet, wherein the tank system is in a wing of the aircraft or in a pylon between the wing and the gas turbine engine.

2. The gas turbine engine assembly for an aircraft according to claim 1, wherein at least one of the rotating turbine blades and/or the stator blades includes the catalyst.

3. The gas turbine engine assembly for an aircraft according to claim 1, wherein at least one of the rotating turbine blades includes the catalyst.

4. The gas turbine engine assembly according to claim 1, wherein the catalyst is platinum.

5. The gas turbine engine assembly according to claim 1, wherein the gas turbine ending further includes a core thrust region and a bypass section surrounding the core thrust region,
wherein at least 90% by mass of the catalyst is in the core thrust region.

6. The gas turbine engine assembly according to claim 1, further comprising a grid downstream of the hot post-combustion section, wherein the grid comprises at least part of the catalyst.

7. The gas turbine engine assembly according to claim 1, wherein each of the rotating turbine blades and the stator blades forms part of a high-pressure turbine section in the hot post-combustion section.

8. The gas turbine engine assembly according to claim 1, further comprising a tank system configured to supply the exhaust fluid additive to the outlet.

9. The aircraft comprising the gas turbine engine assembly according to claim 1.

10. The gas turbine assembly according to claim 1 wherein the exhaust fluid additive includes urea and/or water.

11. A method of reducing nitric oxides (NOx) emissions from an aircraft jet engine on an aircraft, the method comprising:
combusting jet fuel in a combustion chamber of the aircraft jet engine wherein combustion gases generated by the combustion include nitrogen oxides (NOx) gases,
passing the combustion gases between stator blades and rotating turbine blades in a hot post-combustion section of the aircraft jet engine;
storing an exhaust fluid additive in a tank system in a wing of the aircraft or in a pylon between the wing and the aircraft jet engine;
supplying the exhaust fluid additive from the tank system to the aircraft jet engine, wherein the exhaust fluid additive has a different composition than the jet fuel;
discharging the exhaust fluid additive from one or more outlets in at least one of the stator blades into the combustion gases, wherein the at least one of the stator blades with the one or more outlets is between a plurality of the rotating turbine blades, and
reacting the NOx gases with the exhaust fluid additive in presence of a catalyst, wherein the catalyst forms at least part of a surface of the jet engine exposed to the combustion gases downstream of the one or more outlets in the at least one stator blade.

12. The method of claim 11, wherein the surface of the jet engine is a surface of a turbine blade in the jet engine.

13. The method of claim 11, wherein the exhaust fluid additive includes urea and/or water.

14. A method of operating an aircraft gas turbine on a aircraft, the method comprising:
generating combustion gases in a combustion section of the aircraft gas turbine by burning jet fuel in the combustion section;
passing the combustion gases through rotating turbine blades and stator blades in a turbine section of the aircraft gas turbine;
storing an exhaust fluid additive in a tank system in a wing of the aircraft or in a pylon between the wing and the aircraft gas turbine, wherein the exhaust fluid additive has a different composition than the jet fuel;

supplying the exhaust fluid additive from the tank system to the aircraft jet engine;

injecting the exhaust fluid additive into the combustion gases flowing through the turbine section from one or more outlets in at least one of the stator blades between a plurality of the rotating turbine blades;

passing the combustion gases with the exhaust fluid additive over a catalyst on a surface of at least one of the rotating turbine blades and/or stator blades that are downstream of the one or more outlets in the at least one stator blade, and reacting the exhaust fluid additive with a combustion gas generated within the gas turbine engine in the presence of the catalyst.

15. The method of claim 14, wherein the exhaust fluid additive includes urea and/or water.

* * * * *